March 15, 1938.  L. E. LAWRENCE  2,110,993

STORAGE BATTERY

Filed Sept. 8, 1933

INVENTOR
L. E. LAWRENCE
BY H. A. Whitehorn
ATTORNEY

Patented Mar. 15, 1938

2,110,993

UNITED STATES PATENT OFFICE 2,110,993

STORAGE BATTERY

Leland E. Lawrence, La Grange Park, Ill., assignor to Western Electric Company, Incorporated, New York, N. Y., a corporation of New York Application September 8, 1933, Serial No. 688,593

3 Claims. (Cl. 136—26)

This invention relates to storage batteries and more particularly to electrodes therefor.

An object of the invention is to provide a more efficient and practical storage battery.

In accordance with the object, one embodiment of the invention contemplates a storage battery comprising a plurality of electrodes having circumferential grooves in which an active material is disposed and held in place by porous sleeves, the electrodes being electrically connected in positive and negative groups and disposed in a casing provided with an electrolytic solution.

One of the features of the invention consists of using a porous expander, such as porous hard rubber, in the active material to give the electrolyte solution a readier and more complete access to the active material.

Other objects and advantages will be apparent from the following detailed description taken from the accompanying drawing, wherein—

Figure 2:
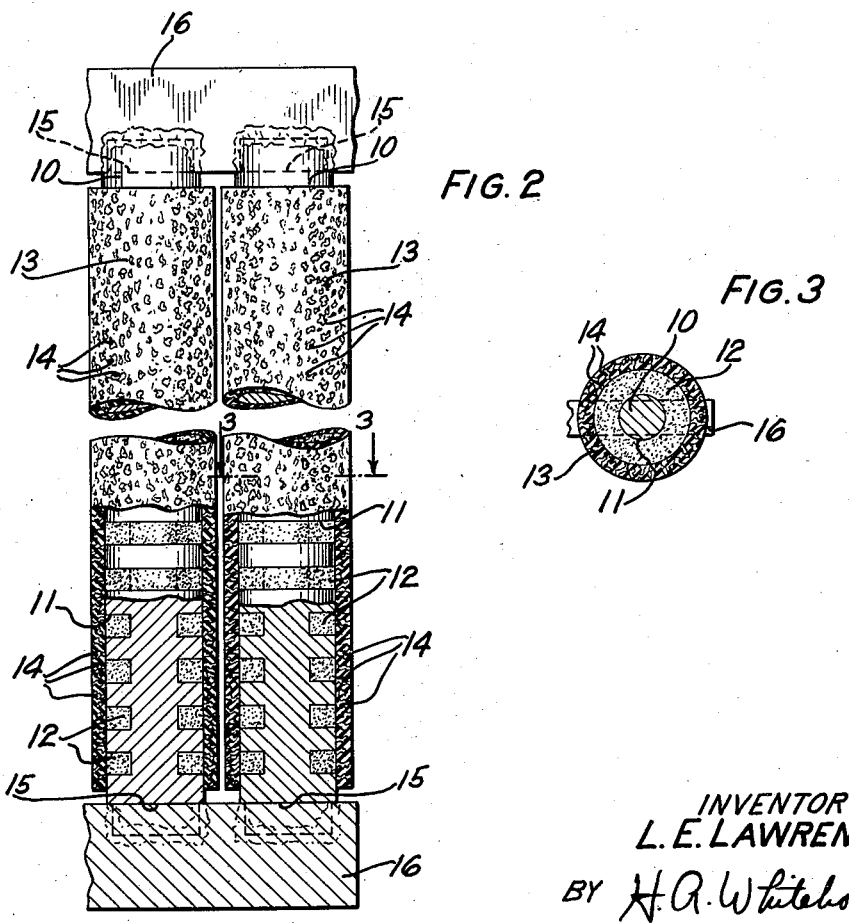
Fig. 2 is an enlarged sectional view taken along the line 2—2 of Fig. 1.
Figure 3:
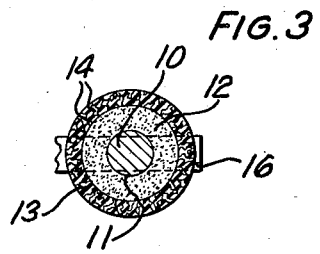
Fig. 3 is a sectional view taken along the line 3—3 of Fig. 2.

Referring now to the drawing, attention is directed to Fig. 2 where reference numeral 10 designates an electrode, preferably of lead or a lead alloy, circular in cross-section and having a plurality of circumferential grooves 11 disposed at spaced positions between the two ends thereof. The grooves 11 are filled with an active material 12 which may comprise approximately 15% lead orthoplumbate ($Pb_3O_4$), 84% lead monoxide (PbO) and 1% porous hard rubber particles. To the resulting mixture is added a quantity of water of about 40% by weight.

The active material 12, which is in paste form, is disposed in the grooves 11, filling the grooves to the peripheral surface of the electrode 10.

A sleeve 13 is disposed concentric with the electrode, having its inner wall fitting flush with the peripheral surface of the electrode so as to retain the active material in the grooves 11. The sleeve 13 is formed of porous hard rubber molded in plates or blocks slightly thicker than the outer diameter of the finished sleeve. These blocks of porous hard rubber are made according to the general process known to the trade for producing sponge rubber, with the exception that the ratio of sulphur to rubber is increased so that hard instead of soft rubber is produced. In forming the pores in the hard rubber, a quantity of bicarbonate of soda, or other suitable material, is mixed with the rubber while in a soft stage, after which the rubber thus treated is placed in a mold where it is heated to a sufficient temperature to convert the bicarbonate of soda into a gas which is allowed to escape, leaving a multiplicity of pores in the rubber which is hardened during this treatment. The size of the pores may be varied by varying the amount of material disposed in the mold cavity.

After the material has cooled, it is removed from the mold and cut in strips approximately square in cross-section, which strips are drilled longitudinally to form an aperture with a diameter susbtantially equal to the outer diameter of the electrode. The strips are then turned on a lathe to produce a finished sleeve of a suitable thickness and thus remove any glazed surface which might be present. The porous hard rubber particles which are cut from the strips during the forming of the sleeves may be salvaged for use in the active material to serve as a porous expanding agent.

The pores 14 of the sleeve are of sufficient fineness and sufficiently multitudinous in quantity that an electrolyte solution may readily gain access therethrough to all the exposed active material, yet prevent the active material from leaving the grooves.

Figure 1:
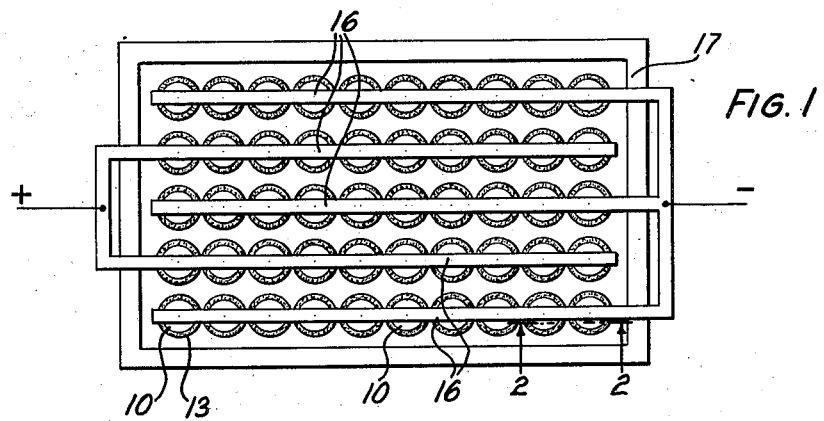
Fig. 1 is a top plan view of a battery embodying the invention.

A plurality of electrodes as just described are connected in groups by forming recesses 15 in the ends of the electrodes and placing connecting members 16, such as lead strips, in the recesses 15 and causing a positive electrical connection between the members 16 and the electrodes 10 by any suitable means, such as soldering. One or more groups of electrodes may be charged positively and the other group or groups may be charged negatively. As shown in Fig. 1 these groups are disposed in a container 17 of any suitable type in which is disposed the electrolyte solution, which preferably is the usual solution consisting of approximately 29% sulphuric acid ($H_2SO_4$) by weight and the rest water, resulting in a solution having a specific gravity of 1.215 grams per cubic centimeter.

The porous sleeve 13 of each electrode unit eliminates the possibility of the active material scaling off during the charging and discharging process while the battery is in use, thus eliminating the possibility of the active material dropping to the bottom of the container and shortcircuiting the electrodes, as often occurs in conventional types of storage batteries. Furthermore, the sleeves obviate the need of separators between the plates, each group of electrodes constituting a plate of the storage battery. The forming of pores in the sleeve during the molding thereof results in the provision of passageways of such fineness that the electrolyte solution may readily gain access to the active material 12 without the possibility of the active material escaping therethrough, thus increasing the active life of the storage battery.

The use of porous hard rubber in the active material 12 increases the effectiveness of the active material in that it acts as a porous expander and permits the electrolyte solution to readily penetrate the active material. Furthermore, by placing the active material in a plurality of grooves formed in the electrode 10, the maximum contacting area of the active material with the electrode is obtained. The effectiveness of the active material is increased by the porous expanding agent, such as porous hard rubber, and the mixture of water therewith renders the active material readily accessible by the electrolyte. The maximum capacity of the storage battery is thus obtained.

Although a specific embodiment of the invention has been described in detail hereinbefore, it is to be understood that modifications and adaptations may be made within the scope of the appended claims.

What is claimed is:

1. In a storage battery, an electrode having grooves therein, and an active material disposed in said grooves including a plurality of particles of porous hard rubber serving as a porous expanding agent.

2. In a storage battery, an electrode having grooves therein, an active material containing particles of porous hard rubber serving as a porous expanding agent therefor, an electrolytic solution surrounding said electrode and contacting with said active material, said porous expanding agent allowing said solution to readily penetrate said active material.

3. In a storage battery, an electrode having grooves therein, an active material disposed in said grooves including a plurality of particles of porous rubber having a sulphur content sufficient to harden the rubber particles serving as a porous expanding agent.

LELAND E. LAWRENCE.